United States Patent [19]

Wu

[11] Patent Number: 5,858,553
[45] Date of Patent: Jan. 12, 1999

[54] OXAZOLIDINE-BASED HARDENERS FOR THE ROOM TEMPERATURE CURE OF RESORCINOL RESINS IN THE BONDING OF WOOD ARTICLES

[75] Inventor: Gaoming Wu, Wheeling, Ill.

[73] Assignee: ANGUS Chemical Company, Buffalo Grove, Ill.

[21] Appl. No.: 825,870

[22] Filed: Apr. 2, 1997

[51] Int. Cl.[6] .......................... B32B 27/42; C08F 283/00
[52] U.S. Cl. .................... 428/524; 528/403; 528/406; 528/422; 525/486; 525/534; 525/540; 428/526
[58] Field of Search .................... 528/403, 406, 528/422; 525/486, 534, 540; 428/524, 526

[56] References Cited

U.S. PATENT DOCUMENTS

| | | | |
|---|---|---|---|
| 3,600,353 | 8/1971 | Baker | 260/38 |
| 3,705,832 | 12/1972 | Stephan et al. | 156/310 |
| 4,034,012 | 7/1977 | Gillern | 260/828 |
| 4,175,065 | 11/1979 | Andersson | 260/29.3 |
| 4,373,062 | 2/1983 | Brown | 524/841 |
| 4,942,191 | 7/1990 | Rogers | 524/17 |
| 5,532,330 | 7/1996 | Pizzi et al. | 528/125 |

FOREIGN PATENT DOCUMENTS

| | | | |
|---|---|---|---|
| 0 639 608 A1 | 2/1995 | European Pat. Off. | C08H 5/00 |
| 0 648 807 A1 | 4/1995 | European Pat. Off. | C08K 11/00 |
| 0 666 296 A1 | 8/1995 | European Pat. Off. | C09J 161/06 |
| 06088010 A | 3/1994 | Japan | C08L 61/06 |

OTHER PUBLICATIONS

Herfindal, Larry, *Radio Frequency Wood Gluing*, HB Fuller Company, Aug. 1990.

*Primary Examiner*—Samuel A. Acquah
*Attorney, Agent, or Firm*—Arnold White & Durkee

[57] ABSTRACT

An improved oxazolidine-based hardener to be used with a resorcinol resin or a tannin resin as the adhesive for the bonding of wood articles. Preferably, an oxazolidine is combined with a base such as NaOH and a powdered absorbent such as wheat flour. The adhesive based on the improved hardener can be used to glue wood particles to pass wet strength requirements after the glue is cured at room temperature for under 24 hours. The improved hardener composition is storage stable; it can be prepared anytime before its use, thus eliminating the need to prepare a hardener immediately prior to the glue use. Since it is formaldehyde-free; it eliminates the safety issues associated with handling formaldehyde or paraformaldehyde. Also, the hardener provides flexible gel time or working time. Since the resins can be cured at room temperature, heating in an oven is not needed but could be used to reduce curing time. If radio frequencies are used to cure the resins, the exposure time can be reduced.

40 Claims, No Drawings

5,858,553

OXAZOLIDINE-BASED HARDENERS FOR THE ROOM TEMPERATURE CURE OF RESORCINOL RESINS IN THE BONDING OF WOOD ARTICLES

BACKGROUND OF THE INVENTION

Wood is one of the most commonly used natural materials and there is still a relatively abundant supply. However, as more and more articles are being made of wood, the reduction in the supply of large trees and of high quality trees is becoming more serious. Therefore, the forest and lumber industry is trying to make the best use of wood through the use of synthetic adhesives. Examples of articles which use adhesives include particle boards, plywood, oriented strand boards, laminated beams, I-beams, and other engineered woods. An added advantage of making wood products with an adhesive system is that the so-produced woods are sometimes much stronger than natural woods because of the higher physical and chemical stability and the higher strength of glue relative to wood.

One of the most commonly used adhesives in the wood bonding industry is based on phenolic resins. A typical phenolic resin is made from the condensation polymerization of phenol with formaldehyde in the presence of a catalyst such as NaOH. Presently, numerous phenolic resins are tailor-made to suit different types of wood and for different shapes of wood articles. Traditional phenol-formaldehyde resins are chemically not reactive enough, so they have to be cured or used at high temperatures. The use of high temperature not only consumes a lot of energy, but also generates safety issues. The use of high temperatures can cause volatile organic compounds, called VOC's, to evaporate in the ovens. These often-toxic vapors eventually end up being released into the environment, mainly through stack emissions. Another safety concern with traditional phenolic resins is that they always contain some formaldehyde, which is a carcinogen.

If an adhesive can be cured at room temperature, capital and operating costs can be reduced. Therefore, phenolic resin manufacturers and wood manufacturers have concentrated their efforts on developing better adhesives that can cure at room temperature and that are safer to handle and use than traditional phenolic adhesives. The most promising technology that is presently being used is a two-component resorcinol adhesive. One part is a resorcinol-formaldehyde resin that is deficient in formaldehyde; and the other is simply formaldehyde or a formaldehyde donor. This adhesive takes advantage of the high reactivity of resorcinol so as to make possible the curing of the adhesive at room temperature.

Initially, resorcinol-formaldehyde resins were used for these applications. To reduce the impact of the high cost of resorcinol, phenol was later introduced to partially replace some of the resorcinol in the resin. Presently, phenol-resorcinol-formaldehyde resins are widely used as the adhesive for wood bonding purposes. In this two-part adhesive system, one part is usually formaldehyde or paraformaldehyde, called the hardener in the industry. The use of formaldehyde or paraformaldehyde is essential for the adhesive to work. However, formaldehyde and paraformaldehyde bring with them a lot of safety issues, since they are both carcinogens. The transportation, storage, handling, exposure, and stack emissions of these harmful compounds are closely watched by EPA and various other governmental bodies. Paraformaldehyde is presently the most commonly used hardener for resorcinol resins. Paraformaldehyde is a powder, and it is extremely difficult to work with because the dust is very hard to control. It is very toxic, and it readily decomposes and releases formaldehyde, which is very difficult to work with. The handling of paraformaldehyde thus is not very safe and requires special attention. Another disadvantage of paraformaldehyde is that it normally has to be prepared as a dispersion just immediately prior to its use. This is because such dispersions can easily settle and decompose to formaldehyde, which evaporates into the air, resulting in a concentration change of the active ingredient. Therefore, the industry typically has to prepare the dispersion, then use it within a short period of time in order to maintain consistent performance and avoid settling and down time. Therefore, the resorcinol resin-paraformaldehyde adhesive system permits curing at room temperature, but it has not addressed the safety issues of dusting and toxicity.

Recent efforts of wood manufacturers and adhesive manufacturers have been directed to developing hardeners to replace paraformaldehyde, so as to eliminate the dusting, toxicity and safety problems associated with paraformaldehyde and formaldehyde. One of the most promising technologies is based on oxazolidine chemistry. Oxazolidines are made from amino alcohols with formaldehyde. An oxazolidine can be very stable, and no free formaldehyde can be detected, therefore its transportation does not present any exposure problems. An oxazolidine reacts with a resorcinol through chemical transfer, which means that the formaldehyde will only leave the amino alcohol molecule when it is in direct contact with a resorcinol molecule. The whole transfer process does not involve any formation of formaldehyde, thus completely eliminating all the safety issues of paraformaldehyde handling, workplace exposure and emissions. It also does not have the settling problem of paraformaldehyde, thus increasing product consistency and reducing down-time. Resorcinol resin-oxazolidine type adhesives represent a tremendous improvement over resorcinol resin-paraformaldehyde system, and so have gained popularity. However, current oxazolidine hardeners used by the industry have some limitations. A major deficiency of oxazolidine-based hardeners is that the hardener is unable to cure a resorcinol resin at room temperature in less than 24 hours and achieve a strong bond passing the required wet strength (ASTM D 2559). Under similar conditions, paraformaldehyde-based hardeners can cure a resorcinol resin very efficiently at room temperature within 24 hours and provide the needed wet strength. Another limitation is that the oxazolidine-based hardeners typically have a much shorter gel time or working time relative to that of paraformaldehyde-based hardener.

Therefore, it has been the concern of the present inventor to provide a liquid hardener to be used with a resorcinol resin as an adhesive that can cure at room temperature within 24 hours to glue wood articles and which produces strong gluelines passing wet strength specifications. Also, a new liquid hardener should eliminate the safety hazards of formaldehyde and paraformaldehyde and provide a longer gel time for the gluing of wood articles than the present oxazolidine hardeners.

SUMMARY OF THE INVENTION

The present invention provides an improved hardener composition to be used at room temperature with a resorcinol resin for bonding wood articles.

The improved hardener comprises, among others, three ingredients: as a formaldehyde donor, an oxazolidine with the formulas shown below, a base in an amount sufficient to retard the reaction of oxazolidine with resorcinol resin and an effective amount of an efficient flexible sorbent. Water is also required, although it generally is used in larger amounts than are needed for the hardener to cure the resorcinol resin.

Examples of efficient flexible sorbents suitable for this invention are hydroxyethyl cellulose, hydroxypropyl cellulose, methyl cellulose, corn meal flour, rice powder, soy flour, and wheat flour. The sorbent is preferably mixed with the oxazolidine but it can also be mixed with the resorcinol resin. Alternatively, the sorbent can be added either to the hardener before use, or it can be added immediately prior to the use of the glue after the other components have been mixed with the resin.

The base may be either organic or inorganic. An inorganic base is preferred, for example, NaOH, KOH, LiOH, MgO, $Ba(OH)_2$, $Ca(OH)_2$, CaO, $Mg(OH)_2$, $Al(OH)_3$, and CsOH. The base is preferably mixed with the resorcinol resin, but it can also be mixed into the other components of the oxazolidine hardener.

Examples of resorcinol resins which may be used with this improved hardener are resorcinol-formaldehyde resins, phenol-resorcinol-formaldehyde resins, tannin resins, tannin-phenol-formaldehyde resins, and tannin-formaldehyde resins.

The use of the improved hardener with a resorcinol resin produces a strong bond between the adhesive and wood after being cured for under 24 hours at room temperature. The glued wood article is water resistant as demonstrated by passing three cycles of vacuum-pressure treatments according to ASTM D 2559. The hardener is stable and can be made anytime before its use. There is no need to prepare the hardeners immediately before its use, as was the case with conventional paraformaldehyde hardeners. It eliminates the need to deal with toxic paraformaldehyde powder and its dusting. Operational consistency is improved because of the higher stability of the hardener and the elimination of settling of solid paraformaldehyde powders to the bottom of the hardener during storage and application. The hardener can be handled more easily than a paraformaldehyde-based hardener because it is a liquid. In another aspect, the invention provides a hardener that has a longer gel time so that more operational flexibility is achieved during the application of the adhesive. The improved hardener for resorcinol resins can be used with radio frequency curing or with oven curing for improved productivity, higher wet strength and stronger adhesion. Lower temperatures and shorter times are possible, while still achieving the desired degree of cure.

The invention in another aspect is an improved two-part adhesive system, of which one part is a resorcinol resin and the other is a hardener. The improved adhesive composition may be used for gluing of wood articles, such as laminated beams, I-beams, engineered woods, particle boards, oriented strand boards, and plywoods. More specifically, the adhesive system will cure at room temperature, although radio frequency curing or oven curing can be used if desired. It is formaldehyde-free, liquid, and produces bonds with a high wet strength.

DETAILED DESCRIPTION OF THE PREFERRED EMBODIMENTS

Phenolic Resins and Resorconol Resins

Phenolic resins and resorcinol resins are widely used as adhesives for wood articles. Resorcinol resins are condensation products of formaldehyde or other aldehydes with resorcinol or a resorcinol derivative such as tannin. Phenols may be included in such resins. Examples include resorcinol-formaldehyde resins, phenol-resorcinol-formaldehyde resins, tannin resins, tannin-formaldehyde resins, and tannin-phenol-formaldehyde resins. A resorcinol resin is produced in the presence of a small amount of base, and the final pH of the resin is around 5–8. Typically these resins are solutions in a mixture of solvents. Resorcinol resins as made are deficient in formaldehyde. This is done because the resin will undergo reaction even at room temperature and cause premature gelling if more formaldehyde is present. Therefore, a resorcinol resin has to be used with another component called a hardener to be useful as an adhesive.

Hardener Composition

Presently, industrial practice is to use formaldehyde, paraformaldehyde, or oxazolidine as the active ingredient in hardeners. The disadvantages of using formaldehyde or paraformaldehyde have been discussed above. Oxazolidines have been used since they can provide formaldehyde to cure resorcinol resins. The improved hardener of this invention comprises among others, the following three ingredients:

I. As a formaldehyde donor, an oxazolidine with the general molecular structure shown below.

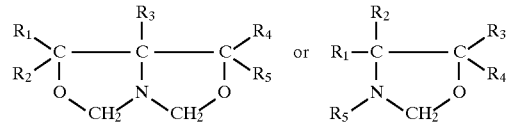

in which $R_1$, $R_2$, $R_3$, $R_4$, and $R_5$ are independently hydrogen, hydroxyl, branched or straight chain alkyl, or branched or straight chain hydroxyl alkyl.

Thus, the oxazolidine can be monocyclic or bicyclic, The preferred alkyl groups for $R_1$ to $R_5$ are methyl, ethyl or hydroxyl methyl. Preferred bicyclic oxazilidines are substituted only at the $R_3$ position and preferred monocylic oxazolidines are substituted only at the $R_1$ and $R_2$ positions. A particularly preferred oxazolidine is 5-hydroxymethyl-1-aza-3, 7, -dioxabicyclo [3, 3, 0]octane (Zoldine® ZT-55, Zoldine® ZT-65, and Zoldine® ZT-40, ANGUS Chemical Company).

The hardener can contain more than one oxazolidine, so a mixture of two or more oxazolidines can be used simultaneously, for example to achieve flexibility in gel time.

II. A base which can retard the reaction of oxazolidine with resorcinol resin, preferably an inorganic base. Inorganic bases suitable for this application include NaOH, KOH, LiOH, MgO, $Ba(OH)_2$, $Ca(OH)_2$, CaO, $Mg(OH)_2$, $Al(OH)_3$, and CsOH. The base may be either mixed with the hardener, or preferably, premixed with the resorcinol resin.

III. A flexible and efficient sorbent. Any sorbent may be used that is reasonably flexible; i.e. is not rigid but is compressible, at both dry and wet conditions, and is reasonably swellable in the aqueous oxazolidine solution so as to absorb a certain level of water. Examples of such sorbent are hydroxyethyl cellulose, hydroxypropyl cellulose, methyl cellulose, corn flour, rice powder, soy flour, and wheat flour. The sorbent can be either soluble or insoluble as well as partially soluble. If the sorbent is soluble, it is preferably added just prior to the use of the glue. If the sorbent is insoluble or close to insoluble in aqueous oxazolidine, it may be mixed with the oxazolidine any time before its use.

Consequently, wheat, corn, and soy flours, rice powder, and related grain flours are preferred since they provide the convenience of premixing the hardener. The hardener will also include an effective amount of water, which is needed for the curing reaction. Typically however, it will be used in significantly larger amounts.

The hardener makes it possible to cure resorcinol resin at room temperature while achieving the desired wet strength, which was a surprising discovery. Although we are not sure why and how this hardener works, we believe the improved performance can be related to several factors: for example, better penetration of the adhesive into the wood; increased reactivity of the phenolic resin at room temperature, and the slow release of oxazolidine and water into the glueline during curing.

One modification introduced in the improved hardener of this invention is the addition of a certain amount of an organic base or an inorganic base such as NaOH to the resorcinol resin. A highly basic adhesive mixture may have three effects. First, a higher pH would slow down the speed of the chemical transfer of formaldehyde from an oxazolidine molecule to a resorcinol molecule. This is demonstrated by a longer gel time for the glue when an inorganic base is used as shown in the following examples and Table II below. A longer gel time would give the adhesive more time to penetrate into the interior pores of the wood. This can be very important, especially when the gel time of the adhesive is very short as in the case of current oxazolidine-based adhesives. Another possible benefit is that the increased basicity would increase the reactivity of the phenolic portion of a phenol-resorcinol-formaldehyde resin (PRF). A PRF resin has a more reactive resorcinol portion and a much less reactive phenolic portion. It is often very difficult to generate a fast reaction between formaldehyde and the phenolic portion of a PRF resin at room temperature. It is well known that a higher pH would favor the reaction between a phenolic resin and formaldehyde. The third possible benefit is that the presence of a base may help to break up some of the highly crystalline structures of the wood at the wood-glue interface. Such a loosening-up of the wood may help to develop a stronger adhesion between the wood and the glue.

The introduction of a flexible sorbent such as wheat flour may have the following positive contributions to the adhesive. First, it provides an environment for the slow release of water to facilitate the reaction between oxazolidine and the resorcinol resin in the glueline during curing. This can be understood based on the following reaction.

Resorcinol Resin+Oxazolidine+Water→Crosslinked Resin

Without water present in the vicinity, the oxazolidine ring would not open and reaction with a resorcinol resin would be impossible. Although a high percentage of water is present in the current commercial adhesives based on oxazolidine chemistry, the use efficiency of the water in these systems is believed to be low, considering the absence to of an efficient water sorbent, the long press time (up to 24 hours) and the high pressure used to press the adhesive and the surrounding wood. Thus, under pressure and during a long cure time, much of the water may be squeezed out of the glueline and into the wood. Therefore, much of the water is no longer in direct contact with the glue in the glueline. This would be similar to a filtering process, and most of the water is probably "filtered out" of the glueline under the applied pressure. Evidence from people who are familiar with the art is that oxazolidine-based hardeners are not very efficient with radio-frequency curing. Radio frequency works well only when enough water is present.

As our examples will demonstrate, the sorbent must be efficient. If the sorbent is not a good sorbent of water, it will not improve wet strength as well as a good sorbent will. Because of its crystalline structure and the presence of hydrogen-bonding (H-bonding), wood flour is not an efficient sorbent. It is rigid and not flexible and will not improve wet strength. As demonstrated in the examples, a hardener containing cellulose microcrystallites, another rigid and inefficient sorbent, does not generate a bond with good wet strength. Cellulose derivatives such as hydroxyethyl cellulose and methyl cellulose are soft and are good sorbents, However, most of these cellulose derivatives are soluble. Even when only a small amount is used, a very high viscosity will result immediately. This property of being soluble in water makes it extremely difficult for soluble sorbents to be used commercially. Another type of sorbents is based on starch or grain materials. Wheat flour, either whole grain or all purpose white wheat flour, is mostly insoluble, and it is reasonably flexible (i.e. compressible) when it is dry and wet. It has some hydrogen-bonding, and swells in water, but does not dissolve in water easily. This property makes it an ideal additive since it can be used to prepare a stable hardener. Therefore, grain flour sorbents are preferred in this invention, such as wheat, corn and soy flours and rice powder.

Another very important possible benefit from the introduction of a flexible sorbent is that it may create an environment for the slow release of the oxazolidine along with the water in the glueline during curing. The use of the slow release or addition of one reactant is well known and often used in organic synthesis. When two reactants participate in a reaction, the drop-wise addition of one reactant to the other can change the chemical structures and thus properties of the product, due to the difference in kinetics and reaction mechanisms. In the case of an adhesive, this may help the formation of more evenly distributed crosslinking and possibly higher crosslinking density. This can result in improved physical properties and better wet strength.

One very important performance parameter for any adhesive is its gel time or working time. Depending on the application and the specific equipment at a particular plant location, the gel time of an adhesive is often specified to be in a certain range. For example, the gel time for a two part resorcinol-based adhesive is normally controlled to be from 30 minutes to a few hours time. If the gel time is too short, the adhesive would not give the operators or machines enough time to spread the glue and still leave enough time to clamp or press the glued wood. On the other hand, a too long gel time would not be desired. If the gel time is too long, the glue does not harden for a long period of time even after the wood boards have been clamped and pressed. It will also result in a longer time for the glued boards to stay in the oven to be cured.

In the examples, the gel time in each case was measured at room temperature simply by counting the time difference from the time when the hardener is added to the resorcinol resin (immediately mixed) to the time when the adhesive is unable to form a continuous string when it is lifted up with a tongue depressor.

Adhesive Formulation

The adhesive composition of the invention is a two-part system, that is, the resorcinol resin and the hardener. The composition of both parts may vary significantly and they will be determined by the same and temperature to be used for curing, and the reactivity of the resin and the hardener.

In general, the hardener will represent about 10 to 60 wt. % of the adhesive and the resin about 90 to 40 wt. %. A preferred adhesive will contain about 60 to 80 wt. % of the resin.

The resin reactivity will depend on the degree to which the preliminary polymerization between resorcinol, phenol, and the aldehyde has proceeded, the type of aldehyde used, the relative ratio of resorcinol to phenol and the amount of catalyst. When related compounds such as phenol derivatives or tannins are included, the reactivity will also be affected.

The reactivity of the hardener composition will be affected by the type and amount of oxazolidine(s) chosen, the amount and type of base, and the amount and type of sorbent used. When mixed, the hardener will contain about 10 to 80 wt. % of the oxazolidine, 0.5 to 30 wt. % of the base, and 0.5 to 30 wt. % of the sorbent (on a water-free basis). In one preferred embodiment, the hardener will contain about 35 to 45 wt. % of the oxazolidine, 4 to 8 wt. % of the decelerator e.g. NaOH, and 10 to 20 wt. % of the sorbent, e.g. wheat flour. At least three methods of combining the components into a curable composite are preferred. In one method all the components of the hardener are premixed and later mixed with the resorcinol resin. In the second method the base is premixed with the resorcinol resin, which is subsequently combined with the remaining components of the hardener. In the third method, the sorbent is added last, that is, after the other hardener components have been mixed with the resorcinol resin.

Other additives may be included to improve certain properties of the hardener, e.g. viscosity so that it is easier to handle Examples include, but are not limited to, wood flour, mineral clay, and polyvinyl acetate.

Application of Adhesives to Wood Bonding

Inferior or small pieces of wood can be glued together to make them more useful materials for the construction and furniture industries. Examples of these applications are laminated beams, I-beams, engineered woods, particle boards, oriented strand boards, and plywoods. Gluing wood pieces together involves applying the adhesive and then applying pressure until a full cure is completed. Hardeners which use paraformaldehyde may be cured at room temperature, but other hardeners such as those including oxazolidines have required heating to achieve a satisfactory cure. The adhesive of the present invention can be cured at room temperature while still achieving acceptable wet strength as defined by ASTM D 2559.

When an adhesive is used to glue woods, the glued-up woods must be able to withstand high moisture, humidity, rain and hot weather. This is very critical since a glued-up wood used in construction must be stable for many years. For the measurement of the wet strength of an adhesive, industry standard testing methods have been developed for different types of adhesives and applications. Testing method ASTM D 2559 "Standard Specification for Adhesive for Structural Laminated Wood Products for Use Under Exterior (Wet Use) Exposure Conditions" was chosen to show the performance improvements of our invention. The main reason for choosing this method is that the current commercial oxazolidine-based resorcinol resins generally have poor wet strength and thus usually require oven-curing.

The type of wood chosen for the measurement of wet strength in the examples given below is Douglas Fir having the dimensions 1 inch thick, 6 inches wide and 13 inches long (25.4×152.4×330.2 mm.). The wood was first conditioned for at least a week in a humidity chamber at 23° C. and 65% relative humidity before being tested for wet strength, according to specifications set forth by ASTM D 2559. The wood boards were freshly surfaced before bonding (always within 24 hours of bonding). For each set of experiments, a total of 6 pieces of this wood were used to prepare one laminated wood sample. Separately, if necessary, each particular hardener was prepared according to the specific formula to be tested. Then, it was mixed with a resorcinol resin and other additives when needed. The mixed glue was applied on each face of the board to be bonded with about 0.23 g of glue for each square inch of wood area. This step normally took 5–15 minutes.

The six pieces of wood were assembled, left at room temperature for 5–10 minutes, and then pressed to a pressure of about 500 pounds (227 kg). After 5–10 minutes, the pressure was increased to 12,000 pounds (5455 kg). After waiting for about 5–20 minutes (when gel time allowed), the pressure would normally drop to about 8,000 pounds (3636 kg), and it was adjusted back to 12,000 pounds (5455 kg). After the wood sample had been pressed at room temperature for about 7–15 hours, it was then cut to the right size (3×5 inches) (76.2×127 mm) and stored in the humidity chamber waiting to be tested for wet strength.

The testing procedure for wet strength used in the examples was identical to that described in ASTM D 2559. Briefly, it comprises of three cycles of vacuum, pressure, steam and dry treatments during a period of 3 days. For all our examples, the cure time, i.e. the time from gluing to the time when the wet strength test was started was from 15 to 24 hours. Therefore, the curing in each case was at room temperature for less than 24 hours. At the end of the three cycle treatments, wet strength expressed by delamination was calculated for each glueline and for all the five gluelines all together.

According to ASTM D 2559 testing method and industry standards, laminated wood products must meet the following two requirements in order to be certified for exterior use.

A. The total delamination of the five gluelines must not be higher than 5%; and

B. The delamination in each individual glueline must not be higher than 1%. The degree of delamination is measured along two sides of each sample across the grain of the wood.

EXAMPLE 1

(COMPARATIVE)

A commercial adhesive, representing the present state of the art, was tested for wet strength and gel time. Therefore, to 85 g of a commercial phenol-resorcinol-formaldehyde resin, Neste PRF 3001, was added 35.8 g of a commercial oxazolidine-based hardener, Neste H1001. It was then mixed at room temperature for about 3 minutes. This glue was used to laminate 6 plies of 1 inch thick, 6 inch wide and 13 inch long (25.4×152.4×330.2 mm) Douglas Fir wood, then cured at room temperature for 24 hours, and finally tested for wet strength according to the ASTM D 2559 method described earlier. The wet strength results expressed in percent delamination for each glueline and for all the gluelines together are given in Table II. The results demonstrated that the present commercial resorcinol adhesive based on a PRF resin and oxazolidine hardener does not meet wet strength requirements when the glue is cured at room temperature for 24 hours. Total delamination of 67% failed to meet the test requirements of less than 5%. In addition, it was noticed that, even for those 30% of the gluelines thought to be un-delaminated, the glueline was found to be very weak and loosely bonded when examined closely.

This glue was also checked for gel time and the result is given in Table II. A gel time of 24 minutes is short by industry standards. Often a longer gel time than this is preferred to allow for more working time and more flexibility in operation.

EXAMPLE 2

A hardener was first prepared by gradually adding 36 g of wheat flour to 137.1 g of Zoldine® ZT-65 (ANGUS Chemical Company) and 15 g of water at room temperature, then mixing for one hour at room temperature.

Separately, 120 g of a phenol-resorcinol-formaldehyde resin (Neste PRF 3001) was mixed with 4.6 g of 85% KOH for about 10 minutes while cooling the resin in a 20°–25° C. water bath. To this resin was added 44.3 g of the hardener prepared above, and then they were mixed for about 3 minutes. This glue was used to laminate 6 plies of 1 inch×6 inches×13 inches (25.4×152.4×330.2 mm) Douglas Fir wood, then cured at room temperature for 24 hours, and finally tested for wet strength as in Example 1. The results given in Table II show the delamination for each glueline and for all the gluelines. Clearly, with the introduction of KOH and wheat flour according to our invention, wet strength improved dramatically from ~70% total delamination to below 1% total delamination. In fact, the improved hardener has passed both requirements set by ASTM D 2559, i.e. the delamination of each individual glueline is below 1% and the total delamination for all 5 gluelines is below 5%. Therefore, the present invention shows great promise for commercial use.

The above glue was also tested for gel time according to the procedure described earlier. The result is given as Example 2 in Table II. Gel time increased to 75 minutes from just 24 minutes of the glue without this modification (Example 1).

Although the KOH in this example was added to the PRF resin, in practice it can also be added to the hardener any time prior to the use of the hardener. Similarly, the wheat flour can also be added to the PRF resin.

EXAMPLE 3

Example 2 was repeated except that NaOH was used to replace KOH and the amount of NaOH, Zoldine® ZT-65, water and wheat flour was slightly different, as given in Table I. In this example, total delamination has also improved to below 1% and gel time has lengthened to 77 minutes. Even though NaOH is slightly less basic, it was found to be equally effective in improving wet strength.

EXAMPLE 4

Example 2 was repeated except that $Ca(OH)_2$ was used to replace KOH, and that the amount of $Ca(OH)_2$, Zoldine® ZT-65, water and wheat flour was slightly different, as given in Table I. In this example, gel time is shown to have been increased to 60 minutes, and total delamination has improved to about 30%. Since $Ca(OH)_2$ is not as effective as NaOH and KOH, it suggests that a base with lower basicity is less effective for wet strength improvement.

EXAMPLE 5

Example 2 was repeated except that ground corn meal was used to replace wheat flour. The results from this example as given in Table II show that corn meal works equally well as wheat flour in improving the wet strength and gel time.

EXAMPLE 6

To 120 grams of a resorcinol resin (Neste PRF 3001), was added 3.5 grams of water and 4.6 grams of 85% KOH. While cooling the mixture in a 20°–25° C. water bath, the resin was mixed for about 20 minutes with a mechanical stirrer. Then, 32.3 grams of Zoldine® ZT-65 was added and mixed with the glue for about 3 minutes. Finally, 8.5 grams of hydroxyethyl cellulose (HEC) was added and mixed for about 3 minutes. This glue was used to laminate 6 plies of 1 inch×6 inches×13 inches (25.4×152.4×330.2 mm) Douglas Fir wood, then cured at room temperature for 24 hours, and finally tested for wet strength as in Example 1. The delamination results listed in Table II clearly show that this adhesive has passed both wet strength requirements of ASTM D 2559. The gel time of this glue also increased to 50 minutes.

HEC is a cellulose derivative that no longer has the cellulose crystalline structure and mostly has an amorphous structure. Because of its absence of strong hydrogen-bonding, HEC is easily soluble in water. The fact that HEC is soluble in water makes it much more difficult to use than wheat flour in this hardener application. Wheat flour is mostly insoluble at room temperature, therefore it can be used to prepare a stable hardener any time before the use of the hardener. With HEC, a stable hardener can not be prepared many days before the use of the glue. The dissolving of HEC in the hardener can rapidly increase the viscosity of the hardener and makes it impractical even with the addition of 0.5 to 1% of HEC. The dissolving of HEC in water takes some time, therefore, the glue should be mixed immediately prior to use.

EXAMPLE 7

Example 6 was repeated except that methyl cellulose (MC) (average molecular weight 86,000) was used to replace HEC. With this example, delamination has also improved and passed both requirements required by ASTM D 2559. Since methyl cellulose is also soluble in water, it should be used by mixing the glue with the right amount of methyl cellulose immediately prior to use.

EXAMPLE 8

Example 7 was repeated except that a smaller amount of methyl cellulose and KOH was used than in Example 7. This example demonstrates that acceptable delamination can also be achieved with a lower amount of KOH and methyl cellulose.

EXAMPLE 9

Example 2 was repeated except that cellulose microcrystallites were used to replace the wheat flour for the preparation of the hardener. With the replacement of wheat flour by cellulose microcrystallites, wet strength became much worse. Cellulose microcrystallites are structurally tightly packed. Because of its tight structure, it is a much less efficient sorbent. Cellulose microcrystallites are also much more rigid and have very limited flexibility even in water, This suggests that, to be highly effective in improving wet strength, the sorbent has to be able to absorb a sufficient amount of water and/or oxazolidine, and needs to be reasonably flexible in water. Only when the sorbent is reasonably soft or flexible, can the absorbed water come out of the sorbent easily and react with oxazolidine and then release formaldehyde to finally crosslink the resorcinol resin. If the bonding of water to the sorbent is too tight, water can not come out of the sorbent easily. Cellulose microcrystallites can swell somewhat in water and absorb some water, but they are very rigid and not soft enough to allow water to come out easily. This may be why cellulose microcrystallites are much less effective in improving wet strength.

EXAMPLE 10

Example 3 was repeated except that no NaOH was used. The results as shown in Table II demonstrate that, when only wheat flour is used, wet strength improvement is limited. To be effective, wheat flour should be mixed with an inorganic base.

EXAMPLE 11

Example 1 was repeated except that 3.2% of KOH (based on resorcinol resin weight) was added. The gel time and wet strength results listed in Table II both show improvements, but the wet strength of this glue was far from meeting the two requirements set by ASTM D 2559. This also means that, only when KOH is in use in combination with an efficient and flexible sorbent like wheat flour, that an acceptable wet strength of the glue bond is achievable.

EXAMPLE 12

Example 1 was repeated except that 0.5% methyl cellulose was pre-dissolved in the hardener solution. The gel time and wet strength results given in Table II show essentially no improvement, as compared to Example 1. It was also noticed that, when 0.5% methyl cellulose was used, the viscosity of the glue was very high, i.e. impractical for commercial use. This example demonstrated that the sorbent needs to be insoluble or partially insoluble to be effective in improving wet strength. Once the sorbent is dissolved, it has lost the ability of absorbing, holding and slow release of water mechanism, thus hindering the hardener's usefulness in achieving the right wet strength. Some cellulose derivatives are often mixed and dissolved in adhesives to achieve the right viscosity, but the current invention calls for the use of an insoluble or partially soluble sorbent; or calls for the rapid use of a soluble sorbent immediately after it is mixed with the resorcinol resin and before it is dissolved. A dissolved cellulose derivative is not effective in achieving the right wet strength, and thus it is not within the scope of the present invention.

TABLE 1

The Glue Composition for Example 1 to Example 12

| Example Number | Neste PRF3001 (g) | Neste H1001 (g) | Zoldine ® ZT-65 (65%) (g) | 85% KOH (g) | 50% NAOH (g) | Ca(OH)$_2$ (g) | Water (g) | Sorbent Type and Amount (g) | Total Glue Weight (g) |
|---|---|---|---|---|---|---|---|---|---|
| 1 | 85 | 35.8 | | | | | | | 121 |
| 2 | 120 | | 32.3 | 4.6 | | | 3.5 | Wheat Flour 8.5 g | 169 |
| 3 | 120 | | 29.4 | | 5.8 | | 3.2 | Wheat Flour 7.7 g | 166 |
| 4 | 120 | | 30.2 | | | 2.7 | 6.3 | Wheat Flour 7.9 g | 167 |
| 5 | 120 | | 32.3 | 4.6 | | | 3.5 | Corn Meal 8.5 g | 169 |
| 6 | 120 | | 32.3 | 4.6 | | | 3.5 | HEC 8.5 g | 169 |
| 7 | 170 | | 45.7 | 6.5 | | | 5.0 | MC 12.0 g | 239 |
| 8 | 120 | | 32.3 | 3.0 | | | 8.0 | MC 5.0 g | 168 |
| 9 | 120 | | 32.3 | 4.6 | | | 3.5 | Cellulose Microcrystallites 5.5 g | 169 |
| 10 | 120 | | 29.2 | | | | 3.2 | Wheat Flour 7.7 g | 160 |
| 11 | 100 | 40.0 | | 3.8 | | | | | 144 |
| 12 | 101 | 40.4 | | | | | | MC 0.5 g | 142 |

TABLE II

West Strength and Gel Time Results for Example 1 to Example 12

| Example Number | Hardener Feature | | Gel Time (Mins) | Individual Glueline Delamination (%) | | | | | Total Delamination (%) |
|---|---|---|---|---|---|---|---|---|---|
| | | | | 1 | 2 | 3 | 4 | 5 | |
| 1 | Current Commercial Hardener | | 24 | 14.7 | 7.0 | 13.9 | 16.4 | 15.0 | 67.0 |
| 2 | Wheat Flour: KOH: | *7.1% 3.3% | 75 | 0.0 | 0.3 | 0.0 | 0.3 | 0.0 | 0.6 |
| 3 | Wheat Flour: NaOH: | 6.4% 2.4% | 77 | 0.0 | 0.4 | 0.0 | 0.0 | 0.0 | 0.4 |
| 4 | Wheat Flour: | 6.6% | 60 | 1.6 | 7.7 | 4.9 | 10.9 | 4.1 | 29.2 |

TABLE II-continued

West Strength and Gel Time Results for Example 1 to Example 12

| Example Number | Hardener Feature | | Gel Time (Mins) | Individual Glueline Delamination (%) | | | | | Total Delamination (%) |
|---|---|---|---|---|---|---|---|---|---|
| | | | | 1 | 2 | 3 | 4 | 5 | |
| | Ca(OH)$_2$ | 2.3% | | | | | | | |
| 5 | Corn Meal: | 7.1% | 77 | 0.0 | 0.3 | 0.0 | 0.0 | 0.0 | 0.3 |
| | KOH: | 3.3% | | | | | | | |
| 6 | HEC: | 7.1% | 50 | 0.3 | 0.3 | 0.0 | 0.3 | 0.0 | 0.9 |
| | KOH: | 2.1% | | | | | | | |
| 7 | MC: | 7.1% | 48 | 0.4 | 0.7 | 0.0 | 0.0 | 0.0 | 1.1 |
| | KOH: | 3.3% | | | | | | | |
| 8 | MC: | 4.2% | 50 | 0.0 | 0.0 | 0.3 | 0.0 | 0.8 | 1.1 |
| | KOH: | 2.1% | | | | | | | |
| 9 | Cellulose Microcrystallites | 7.1% | 56 | 0.5 | 6.1 | 2.2 | 2.0 | 9.0 | 19.8 |
| | KOH: | 3.3% | | | | | | | |
| 10 | Wheat Flour: | 6.4% | 40 | 7.4 | 7.6 | 14.1 | 4.3 | 8.1 | 41.4 |
| 11 | KOH: | 3.2% | 52 | 2.4 | 4.9 | 3.9 | 3.3 | 2.9 | 17.4 |
| 12 | MC: | 0.5% | 23 | 13.3 | 7.7 | 15.1 | 15.0 | 12.4 | 63.5 |

*Use level is expressed in the percentage of PRF resin.

What is claimed is:

1. A composition for hardening resorcinol resins comprising:

(a) an oxazolidine compound having the formula

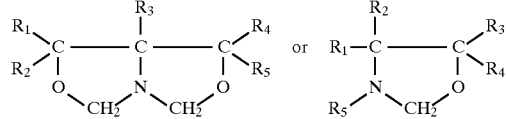

where $R_1$, $R_2$, $R_3$, $R_4$, and $R_5$ are independently hydrogen, hydroxyl, branched or straight chain alkyl, branched or straight chain hydroxy alkyl;

(b) a base in an amount sufficient to retard the reaction of resorcinol resin with the oxazolidine compound of (a);

(c) an effective amount of a sorbent; and (d) an effective amount of water.

2. A composition of claim 1 wherein said base is an inorganic base selected from the group consisting of NaOH, KOH, LiOH, MgO, Ba(OH)$_2$, Ca(OH)$_2$, CaO, Mg(OH)$_2$, Al(OH)$_3$, and CsOH.

3. A composition of claim 1 wherein said sorbent is flexible when wet or dry.

4. A composition of claim 1 wherein said sorbent is selected from the group consisting of hydroxyethyl cellulose, hydroxypropyl cellulose, methyl cellulose, corn flour, rice powder, soy flour, and wheat flour.

5. A composition of claim 1 wherein said sorbent is wheat flour.

6. A composition of claim 5 wherein said base is KOH.

7. A composition of claim 5 wherein said base is NaOH.

8. A composition of claim 1 wherein said sorbent is corn flour.

9. A composition of claim 8 wherein said base is KOH or NaOH.

10. A composition of claim 1 wherein said sorbent is hydroxyethyl cellulose.

11. A composition of claim 10 wherein said base is KOH or NaOH.

12. A composition of claim 1 wherein said sorbent is methyl celluose.

13. A composition of claim 12 wherein said base is KOH or NaOH.

14. A composition of claim 1 comprising 10 to 80 wt % oxazolidine, 0.5 to 30 wt. % base, and 0.5 to 30 wt. % sorbent on a water-free basis.

15. A composition of claim 1 comprising 35 to 45 wt % oxazolidine, 4 to 8 wt. % base, and 10 to 20 wt. % sorbent on a water-free basis.

16. A composition of claim 1 wherein said base of (b) is premixed with said resorcinol resin.

17. A composition of claim 1 wherein said sorbent of (c) is added after components (a), (b) and (d) have been combined with said resorcinol resin.

18. A composition of claim 1 wherein said oxazilidine is 5-hydroxymethyl-1-aza-3,7-dioxa bicyclo [3,3,0] octane.

19. A hardenable composition comprising:

(a) a resorcinol resin;

(b) an oxazolidine compound having the formula

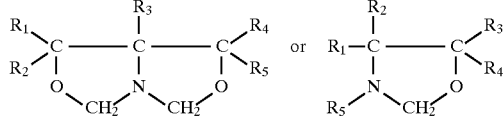

where $R_1$, $R_2$, $R_3$, $R_4$ and $R_5$ are independently hydrogen, hydroxyl, branched or straight chain alkyl, branched or straight chain hydroxy alkyl;

(c) a base in an amount sufficient to retard the reaction of resorcinol resin of (a) with the oxazolidine compound of (b) (1);

(d) an effective amount of a sorbent;

(e) an effective amount of water.

20. A composition of claim 19 wherein said resorcinol resin is at least one member of the group consisting of resorcinol-formaldehyde, phenol-resorcinol-formaldehyde, tannin, tannin-formaldehyde, and tannin-phenol-formaldehyde resins.

21. A composition of claim 19 wherein said base is an inorganic base selected from the group consisting of NaOH, KOH, LiOH, MgO, Ba(OH)$_2$, Ca(OH)$_2$, CaO, Mg(OH)$_2$, Al(OH)$_3$, and CsOH.

22. A composition of claim 19 wherein said sorbent is flexible when wet or dry.

23. A composition of claim 19 wherein said sorbent is selected from the group consisting of hydroxyethyl cellulose, hydroxypropyl cellulose, methyl cellulose and wheat flour.

24. A composition of claim 19 wherein the resin is 40 to 90 wt. %; and the hardener is 10 to 60 wt. % of the composition.

25. A composition of claim 19 wherein said oxazolidine is 5-hydroxymethyl-1-aza-3,7,-dioxa bicyclo [3,3,0] octane.

26. A composition of claim 19 wherein said sorbent is wheat flour.

27. A composition of claim 26 wherein said base is KOH.

28. A composition of claim 26 wherein said base is NaOH.

29. A composite of claim 19 wherein said sorbent is corn flour.

30. A composite of claim 29 wherein said base is KOH or NaOH.

31. A composition of claim 19 wherein said sorbent is hydroxyethyl cellulose.

32. A composition of claim 31 wherein said base is KOH or NaOH.

33. A composition of claim 19 wherein said sorbent is methyl cellulose.

34. A composition of claim 33 wherein said base is KOH or NaOH.

35. A composition of claim 19 wherein said base of (c) is premixed with said resorcinol resin of (a).

36. A composition of claim 19 wherein said sorbent of (d) is added after components (b), (c), and (e) have been combined with said resorcinol resin of (a).

37. A composition of claim 19 which is cured at room temperature or with radio-frequency or oven heating.

38. A composite comprising
    (a) Two or more pieces of wood;
    (b) a cured composition of claim 19.

39. A composite of claim 38 which is a member of the group consisting of laminated beams, I-beams, engineered woods, particle boards, oriented strand boards, and plywoods.

40. A method of bonding wood articles comprising of gluing said articles with the composition of claim 19.

* * * * *